United States Patent
Chang et al.

(10) Patent No.: US 7,352,932 B1
(45) Date of Patent: Apr. 1, 2008

(54) GUIDED-MODE RESONANCE FILTER AND FABRICATION METHOD OF SAME

(75) Inventors: Jenq-Yang Chang, Taoyuan (TW);
Mount-Learn Wu, Taoyuan (TW);
Che-Lung Hsu, Taoyuan (TW);
Chih-Ming Wang, Taoyuan (TW);
Yung-Chih Liu, Taoyuan (TW);
Yue-Hong Chou, Taoyuan (TW);
Ya-Lun Tsai, Taoyuan (TW);
Chien-Chieh Lee, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 11/741,530

(22) Filed: Apr. 27, 2007

(30) Foreign Application Priority Data

Sep. 29, 2006 (TW) .............................. 95136499 A

(51) Int. Cl.
*G02B 6/34* (2006.01)

(52) U.S. Cl. ......................................................... 385/37

(58) Field of Classification Search .................... None
See application file for complete search history.

(56) References Cited

U.S. PATENT DOCUMENTS

2006/0291766 A1* 12/2006 Schulz et al. ................. 385/12

* cited by examiner

*Primary Examiner*—Michelle Connelly-Cushwa
*Assistant Examiner*—Chris Chu
(74) *Attorney, Agent, or Firm*—Kirton & McConkie; Evan R. Witt

(57) ABSTRACT

A silicon bulk-micromachining technology is used to fabricate a GMR filter by exploiting the structure of a suspended silicon nitride (SiNx) membrane on the silicon substrate. A first silicon nitride (SiNx) thin film and a second silicon nitride (SiNx) thin film are formed on opposite sides of the silicon substrate. A first opening is defined in the first silicon nitride (SiNx) thin film, and a grating structure is defined in the second silicon nitride (SiNx) thin film. By etching off a portion of the silicon substrate exposed from the first opening until a portion of the second silicon nitride (SiNx) thin film is exposed from the first opening, a light path space is defined.

20 Claims, 6 Drawing Sheets

$CF_4/O_2$ plasma

GUIDED-MODE RESONANCE FILTER AND FABRICATION METHOD OF SAME

FIELD OF THE INVENTION

The present invention relates to a guided-mode resonance (GMR) filter, and more particularly to a GMR filter for use in a microelectromechanical system (MEMS) or a microelectroopticalmechanical system (MEOMS). The present invention also relates to a method for fabricating a GMR filter, and more particularly to a method for fabricating a GMR filter by way of a semiconductor manufacturing process.

BACKGROUND OF THE INVENTION

Surface and bulk-micromachining techniques have been well developed to fabricate various microelectromechanical system (MEMS) and microelectroopticalmechanical system (MEOMS) structures on the silicon substrate, such as actuators, microheaters, accelerometers, detectors, anemometers, optical transducers such as light switching and optical filtering, and other potential applications. On the other hand, increasing efforts are devoted to the improvement of manufacturing processes for the objectives of proper miniaturization and/or high performance. For example, factors required to be controlled for improved optical performance of electrooptical devices include light directions, light refractive/reflective angles, spectral designs, etc.

Optical filters are key components and offer versatile functionalities in light modulation, optical communication, and wavelength filtering of laser cavities. Different filters exhibit different specific optical functions. Distinguished by functions, optical filters include transmission and reflection filters, bandpass and bandstop filters, narrow bandwidth and wide bandwidth filters. Currently, the most prominent optical filters include thin-film filters and Fabry-Pérot filters. The thin-film filter relying on the interference effect consists of several alternative high- and low-index dielectric thin films coated on a substrate. These stacked films are arranged to be a quarter-wavelength in layer thickness and optimized to eliminate the stress between them. The Fabry-Pérot filter consists of a cavity sandwiched with a specific gap by two parallel partial reflecting mirrors, usually made of metal films or multilayered dielectric films. These filters suffer from various problems such as complex structure with more than 100 individual layers, tight fabrication due to strict tolerance on each layer, and power loss caused by material absorption.

Optical filters based on the guided-mode resonance (GMR) effect have attracted considerable interests because of their simple structures of much fewer layers and superior spectral properties of high efficiency, narrow bandwidth, and angular sensitivity. The GMR filters are commonly composed of dielectric thin-film structures incorporating gratings with periodic modulation of refractive indexes to couple energy diffracted from an incident wave to a leakage mode of the waveguide layer included in the structure.

Please refer to FIG. 1, in which the basic wave-filtering operation of a GMR filter is illustrated. The GMR filter 10 includes a grating structure 11 and a waveguide structure 12, wherein the grating structure 11 is disposed on the waveguide structure 12 with a pattern of lattices and is present with such a small thickness that the operation of the waveguide structure 12 to determine the guided mode of incident light will not be affected by the grating structure 11. When incident light 13 is emitted onto the grating structure 11, the grating structure 11 performs a light-splitting function to have a portion of the incident light 13 coupled to the waveguide structure 12. When the incident light 13 coupled to the waveguide structure 12 is in a phase-matching state admissible by the waveguide structure 12, resonance effect appears. Accordingly, light may traverse the GMR filter 10, as indicated by the direction B, with a selected resonance wavelength after being refracted by the waveguide structure 12. Due to the presence of the grating structure 11, the traversing light is not always kept stable. On the contrary, light reflection by the grating structure 11 would be rendered to be transmitted out of the waveguide structure 12 in the leakage mode. Furthermore, light transmission of a non-resonance portion of the incident light 13 out of the waveguide structure 12 would also be rendered.

It is obvious that GMR filters tend to integrate additional thin-film structures or stack multiple GMR filters to enhance its resonance performance for various applications. Moreover, GMR filters are expected to integrate other passive and active optoelectronic devices to form microsystem chips or become tunable GMR filters. However, most of these devices cannot be fabricated on silicon substrates but on lower-index substrates such as quartz, and then, a thin-film structure of higher refractive index is coated as the guided layer. The utilization of a nonsilicon substrate would restrict the further integration of GMR filters with other optoelectronic devices.

SUMMARY OF THE INVENTION

The present invention provides a semiconductor-based guided-mode resonance (GMR) filter.

The present invention also provides a method for fabricating a GMR filter by using a semiconductor manufacturing process.

A method for fabricating a guided-mode resonance (GMR) filter, according to the present invention includes steps of: providing a semiconductor substrate; forming a first thin film and a second thin film on a first surface and a second surface of the semiconductor substrate, respectively; defining a first opening in the first thin film; defining a grating structure in the second thin film; and etching off a portion of the semiconductor substrate exposed from the first opening until a portion of the second thin film is exposed from the first opening.

In an embodiment, the semiconductor substrate is a single-crystal substrate having an arbitrary lattice direction and polished surfaces.

In an embodiment, the first and second thin films are low-stress silicon nitride (SiNx) thin films formed by a low-pressure chemical vapor deposition (LPCVD) process.

In an embodiment, the method further includes steps of applying a first photoresist layer onto the first thin film; utilizing a first mask to define a pattern of the first photoresist layer; etching the first thin film according to the pattern of the first photoresist layer, thereby creating the first opening in the first thin film; and removing the first photoresist layer.

In an embodiment, in the etching step of the first thin film, a photolithography process is performed with the presence of the first photoresist to transfer the pattern of the first photoresist layer, and a dry-etching process is performed with an inductively coupled plasma (ICP) to remove a portion of the first thin film uncovered by the first photoresist layer.

In an embodiment, the first thin film is etched until the semiconductor substrate is exposed from the first opening, and the resulting first opening is a square hole.

In an embodiment, the method further includes steps of applying a second photoresist layer onto the second thin film; utilizing a second mask to define a pattern of the second photoresist layer; etching the second thin film according to the pattern of the second photoresist layer, thereby creating the grating structure in the second thin film; and removing the second photoresist layer.

In an embodiment, the second photoresist layer is defined by an electron-beam direct writing process with the presence of the second mask.

In an embodiment, in the etching step of the second thin film, a photolithography process is performed with the presence of the second photoresist to transfer the pattern of the second photoresist layer, and a dry-etching process is performed with an inductively coupled plasma (ICP) to remove a portion of the second thin film uncovered by the second photoresist layer.

In an embodiment, the second thin film is etched to a specific depth so that the resulting grating structure consists of a plurality of subwavelength structures.

In an embodiment, the etching step of the semiconductor substrate is performed by a wet-etching process with an etching agent to remove a portion of the semiconductor substrate uncovered by the first thin film. The etching agent preferably has an etching rate ratio of the first and second film films to the semiconductor substrate less than a threshold. For example, the etching agent can be a potassium hydroxide (KOH) aqueous solution.

In an embodiment, the method further includes steps of defining a light path surrounded by the second thin film and an portion of the semiconductor substrate unetched by the etching agent; and forming a third thin film in the light path overlying the second thin film and the unetched portion of the semiconductor substrate. For example, the third thin film can be formed of silicon dioxide ($SiO_2$).

The present invention also relates to a guided-mode resonance (GMR) filter, which comprises a semiconductor substrate having a first surface and a second surface; a first thin film formed on the first surface of the semiconductor substrate and having a first hole therein; a second thin film formed on the second surface of the semiconductor substrate and having a grating structure on a side opposite to the semiconductor substrate; and a light path space formed in the first hole and having the second thin film serving as a bottom thereof.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
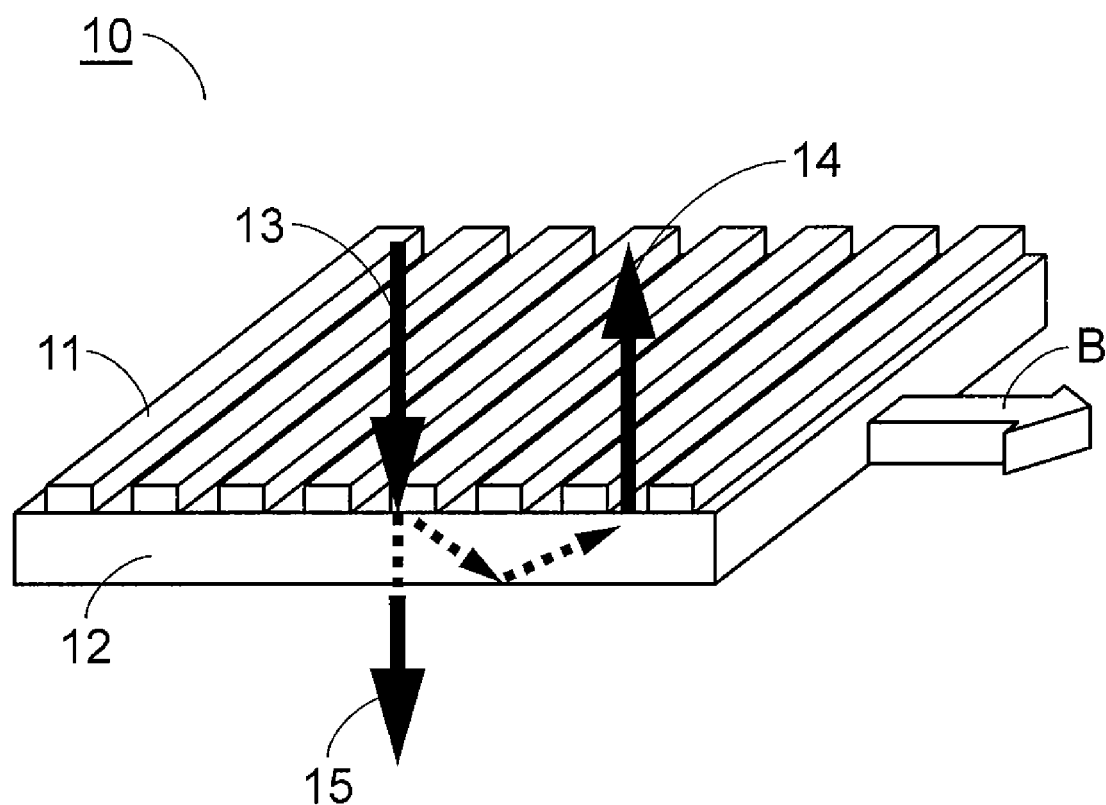
FIG. 1 is a schematic diagram illustrating a conventional GMR filter.
Figure 2A:
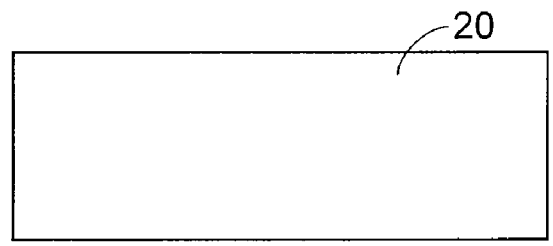
FIG. 2A-2K are cross-sectional diagrams illustrating a method for fabricating a GMR filter according to an embodiment of the present invention.
Figure 2B:
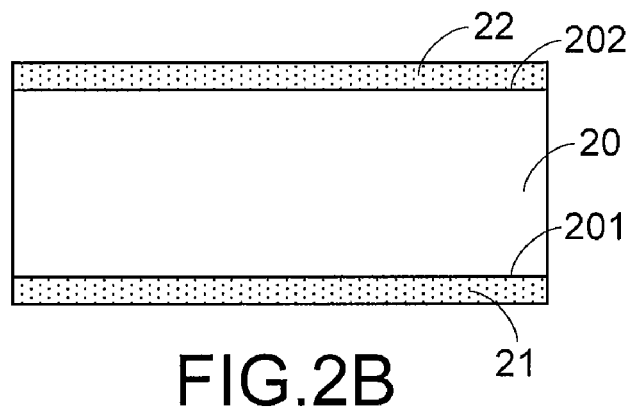
Figure 2C:
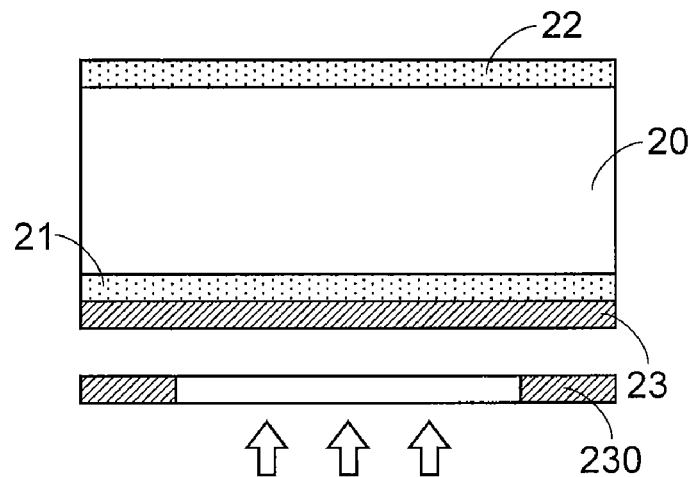
Figure 2D:
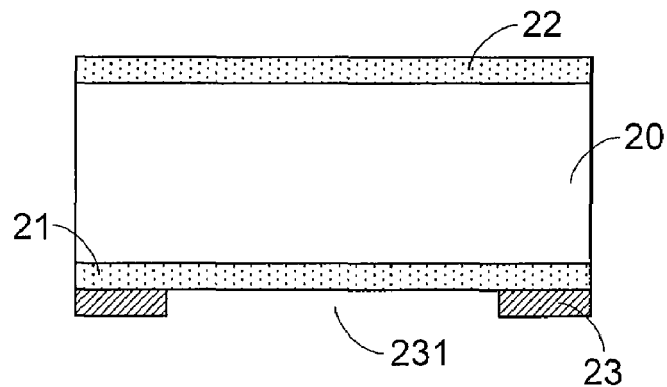
Figure 2E:
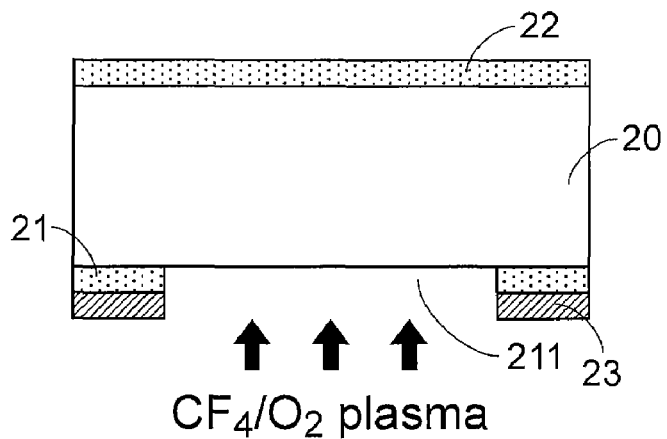
Figure 2F:
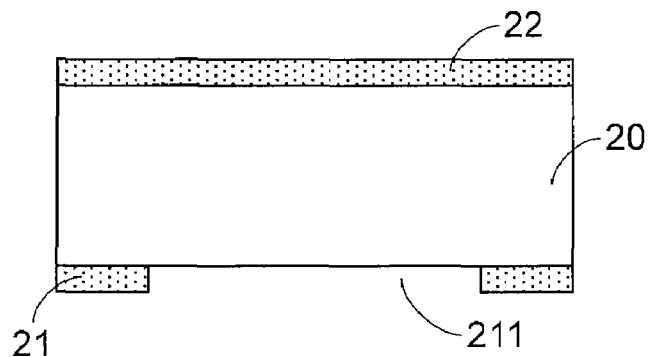
Figure 2G:
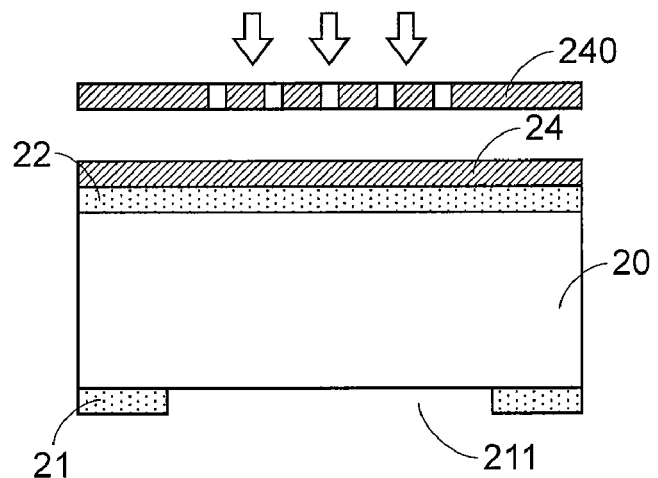

Referring to FIG. 2A-2K, a method for fabricating a GMR filter according to an embodiment of the present invention is illustrated. A single-crystal silicon substrate 20 with an arbitrary lattice direction, e.g. (100), and thickness of about 500 μm is first prepared with polishing and RCA chemical cleaning processes, thereby removing impurity and dusts on its surface (FIG. 2A). Highly reflective thin films 21 and 22, e.g. low-stress silicon nitride (SiNx) thin films, are then deposited onto both sides 201 and 202 of the silicon substrate 20 by using a low-pressure chemical vapor deposition (LPCVD) process for an intended thickness, e.g. 1 μm (FIG. 2B). The deposited SiNx film is controlled to be rich in silicon and, hence, a high-refractive-index material. By sequentially spin-coating a photoresist layer 23 and applying a photomask 230 onto the thin film 21 (FIG. 2C), a square hole 231 is patterned. Then, a square hole 211 is opened on the backside SiNx thin film 21 by using photolithography and inductively coupled plasma (ICP) etch system with $CF_4/O_2$ plasma to remove the uncovered portion of the thin film 21 (FIG. 2D). As a result, the silicon substrate 20 is partially exposed from the square hole 211. Subsequently, the remaining photoresist layer 23 is removed (FIG. 2F).

Figure 2H:
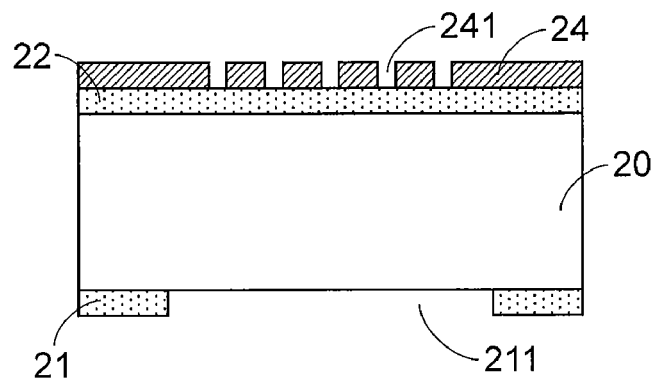
Figure 2I:
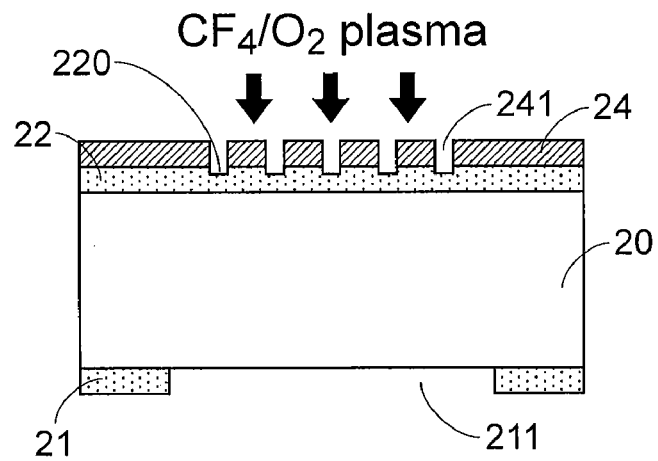
Figure 2J:
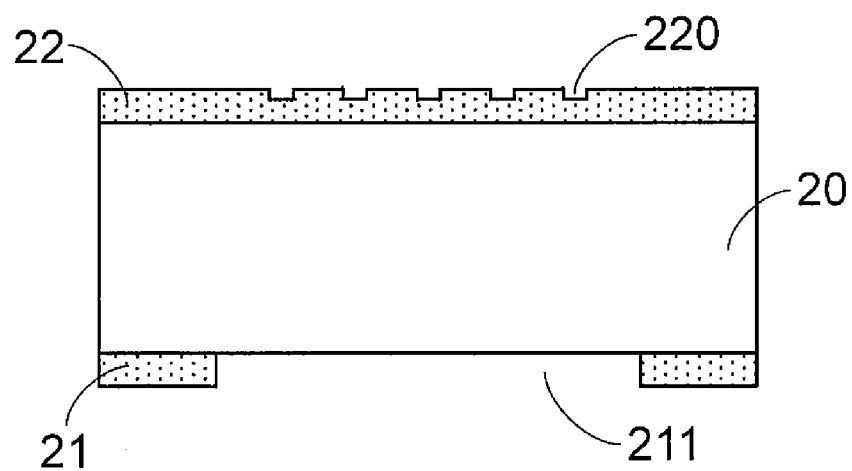

Likewise, a photoresist layer 24 is coated and a photomask 240 is applied onto the thin film 22 (FIG. 2G) to pattern a plurality of cavities 241 (FIG. 2H). Subsequently, the photoresist layer 24 is subjected to an electron-beam direct writing lithography process or any other suitable optical lithography process capable of producing repetitive structures. Then, a grating structure 220 is formed on the topside with a grating depth controlled by an ICP dry etching process (FIG. 2I). Then, the remaining photoresist layer 24 is removed (FIG. 2J). The resulting grating structure 220 can be any proper subwavelength grating structure that can render light diffraction in the waveguide. Alternatively, the resulting grating structure 220 can be formed by overlapping and crossing two striped grating structures.

Figure 2K:
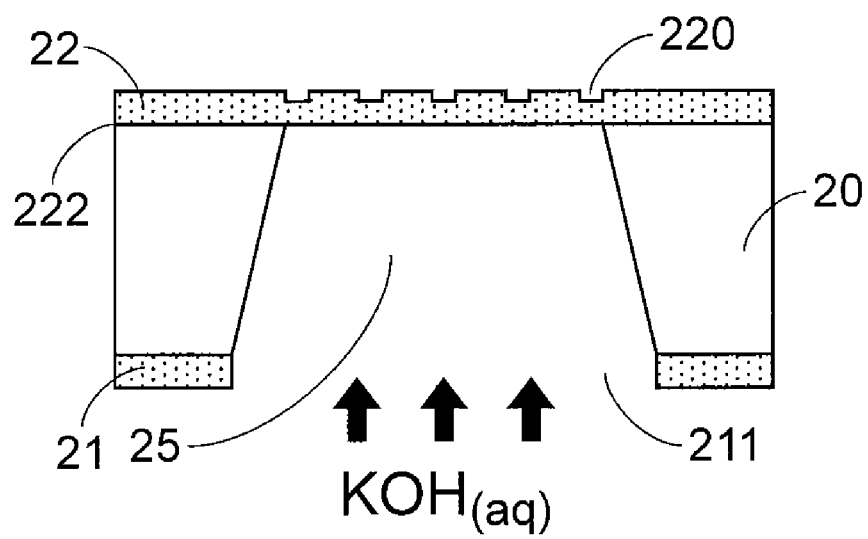

Subsequently, an anisotropic wet etching of a silicon-reactive solution, e.g. KOH aqueous solution, is performed to etch off a portion of the silicon substrate 20 exposed from the hole 211 until the backside 222 of the thin film 22 is exposed (FIG. 2K). Since the etched rate of the thin films 21 and 22 by the KOH aqueous solution, which is at a level of nanometers per hour, is much less than that of the silicon substrate 20 (about 60 μm per hour), the thin film 21 may acts as a protective mask on the backside during the anisotropic etching. As a result, a free standing membrane structure is formed with a light path 25 allowing the incident light transmitting through the thin film 22 to pass therethrough. Since the silicon material in the area of the light path 25 has been removed, the refraction index in the light path 25 is equal to the refraction index of air.

Figure 3:
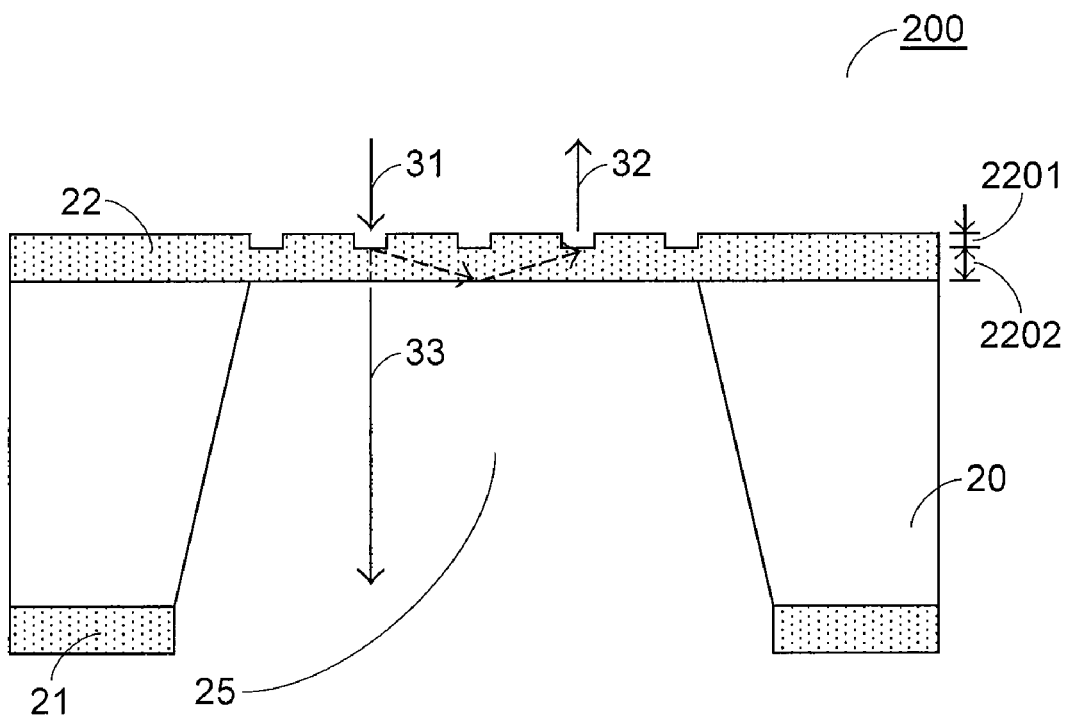
FIG. 3 is a cross-sectional diagram illustrating an embodiment of a GMR filter according to the present invention.

An embodiment of the resulting GMR filter 200 is shown in FIG. 3. In accordance with the presence of cavities, the thin film layer 22 includes a subwavelength grating structure portion 2201 and a waveguide structure portion 2202. Incident light 31, after passing through and being filtered by the subwavelength grating structure portion 2201, results in a light potion with a specific wavelength. The light portion with the specific wavelength exhibits a resonant effect in the waveguide structure portion 2202, and is then reflected as reflective light 32. On the other hand, the other light portion is transmitted out as transmissive light 33 and passes through the light path 25.

Figure 4:
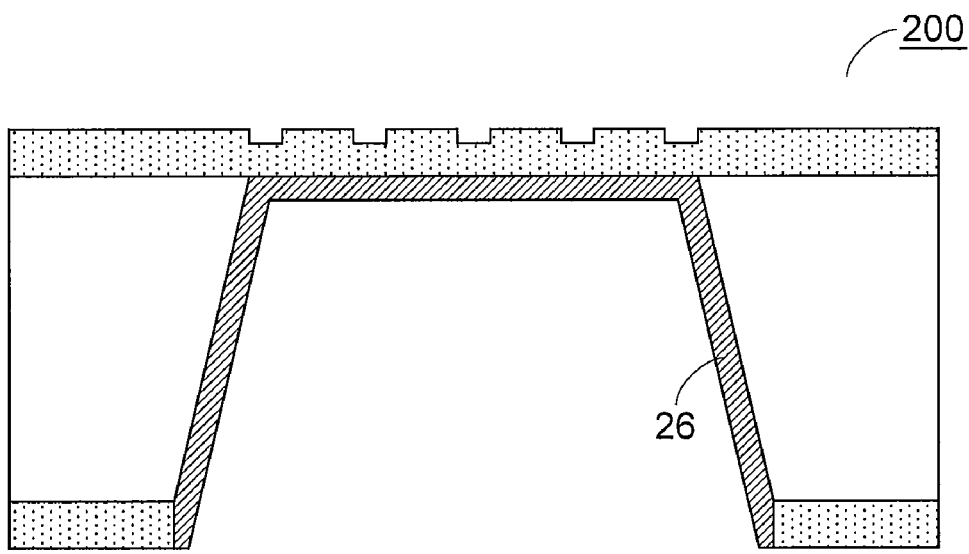
FIG. 4 is a cross-sectional diagram illustrating another embodiment of a GMR filter according to the present invention.

Another embodiment of the resulting GMR filter 300 is shown in FIG. 4. The GMR filter 300 further includes a thin film 26 deposited on the backside of the structure of FIG. 3. The thin film, for example, can be formed of silicon dioxide ($SiO_2$). The bandwidth and frequency distribution of the light generated by the GMR filter 300 vary with the thin film 26, e.g. its thickness. Accordingly, the resulting light can be modified to comply with, for example, narrowband or symmetric requirements, by depositing the thin film 26 and adjusting the deposition thickness or other conditions of the thin film 26.

An embodiment of the present invention uses SiNx thin films in the GMR filter. As is understood, SiNx material possesses several important mechanical characteristics such as superior acid-resistant property, high dielectric strength in electrics, and hardness. Furthermore, SiNx material is transparent within the spectra of visible light and infrared. Since the GMR filter is fabricated in a SiNx membrane suspended on silicon substrate, the rear of the silicon substrate beneath the SiNx layer is totally removed to form an etched cavity. By using such a rear etching on silicon, the SiNx layer on a silicon substrate can be directly adopted as the guided structure of GMR filters without introducing an additional low-refractive-index material between the SiNx layer and the silicon substrate. Furthermore, since the structure is developed based on the ordinary silicon-MEMS technology according to an embodiment of the present invention, the filter can be easily integrated with optoelectronic elements and MEMS devices in a monolithic or hybrid manner for various applications. Therefore, the GMR filter is not only to replace the thin-film filter or others, it is also a basic optical filter structure for various integration applications.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for fabricating a guided-mode resonance (GMR) filter, comprising steps of:
   providing a semiconductor substrate;
   forming a first thin film and a second thin film on a first surface and a second surface of the semiconductor substrate, respectively;
   defining a first opening in the first thin film;
   defining a grating structure in the second thin film; and
   etching off a portion of the semiconductor substrate exposed from the first opening until a portion of the second thin film is exposed from the first opening.

2. The method according to claim 1 wherein the semiconductor substrate is a single-crystal substrate having an arbitrary lattice direction and polished surfaces.

3. The method according to claim 1 wherein the first and second thin films are low-stress silicon nitride (SiNx) thin films formed by a low-pressure chemical vapor deposition (LPCVD) process.

4. The method according to claim 1 further comprising steps of:
   applying a first photoresist layer onto the first thin film;
   utilizing a first mask to define a pattern of the first photoresist layer;
   etching the first thin film according to the pattern of the first photoresist layer, thereby creating the first opening in the first thin film; and
   removing the first photoresist layer.

5. The method according to claim 4 wherein in the etching step of the first thin film, a photolithography process is performed with the presence of the first photoresist to transfer the pattern of the first photoresist layer, and a dry-etching process is performed with an inductively coupled plasma (ICP) to remove a portion of the first thin film uncovered by the first photoresist layer.

6. The method according to claim 5 wherein the first thin film is etched until the semiconductor substrate is exposed from the first opening, and the resulting first opening is a square hole.

7. The method according to claim 1 further comprising steps of:
   applying a second photoresist layer onto the second thin film;
   utilizing a second mask to define a pattern of the second photoresist layer;
   etching the second thin film according to the pattern of the second photoresist layer, thereby creating the grating structure in the second thin film; and
   removing the second photoresist layer.

8. The method according to claim 7 wherein the second photoresist layer is defined by an electron-beam direct writing process with the presence of the second mask.

9. The method according to claim 7 wherein in the etching step of the second thin film, a photolithography process is performed with the presence of the second photoresist to transfer the pattern of the second photoresist layer, and a dry-etching process is performed with an inductively coupled plasma (ICP) to remove a portion of the second thin film uncovered by the second photoresist layer.

10. The method according to claim 9 wherein the second thin film is etched to a specific depth so that the resulting grating structure consists of a plurality of subwavelength structures.

11. The method according to claim 1 wherein the etching step of the semiconductor substrate is performed by a wet-etching process with an etching agent to remove a portion of the semiconductor substrate uncovered by the first thin film.

12. The method according to claim 11 wherein the etching agent has an etching rate ratio of the first and second film films to the semiconductor substrate less than a threshold.

13. The method according to claim 12 wherein the etching agent is a potassium hydroxide (KOH) aqueous solution.

14. The method according to claim 11 further comprising steps of:
   defining a light path surrounded by the second thin film and an portion of the semiconductor substrate unetched by the etching agent; and
   forming a third thin film in the light path overlying the second thin film and the unetched portion of the semiconductor substrate.

15. The method according to claim 14 wherein the third thin film is formed of silicon dioxide ($SiO_2$).

16. A guided-mode resonance (GMR) filter, comprising:
   a semiconductor substrate having a first surface and a second surface;
   a first thin film formed on the first surface of the semiconductor substrate and having a first hole therein;
   a second thin film formed on the second surface of the semiconductor substrate and having a grating structure on a side opposite to the semiconductor substrate; and a light path space formed in the first hole and having the second thin film serving as a bottom thereof.

17. The GMR filter according to claim 16 wherein the semiconductor substrate is a single-crystal substrate having an arbitrary lattice direction and polished surfaces.

18. The GMR filter according to claim 16 wherein the first and second thin films are low-stress silicon nitride (SiNx) thin films.

19. The GMR filter according to claim 16 wherein the first hole is a square hole, and the grating structure includes a plurality of subwavelength structures.

20. The GMR filter according to claim 16 further comprising a third thin film formed of silicon dioxide ($SiO_2$) and overlying the bottom and a wall of the light path space.

* * * * *